Patented Feb. 13, 1951

2,541,105

UNITED STATES PATENT OFFICE 2,541,105

17 - (a) - HYDROXY - 20 - KETO - PREGNANE COMPOUNDS AND PROCESS OF PREPARING THE SAME

Lewis Hastings Sarett, Princeton, N. J., assignor to Merck & Co., Inc., Rahway, N. J., a corporation of New Jersey No Drawing. Application October 7, 1947, Serial No. 778,465

7 Claims. (Cl. 260—397.4)

This invention is concerned generally with novel steroid compounds and with processes for preparing them. More particularly, it relates to the preparation of 17-(a)-hydroxy-20-keto-pregnane compounds from the corresponding 20-keto-pregnane compound and to the intermediate products utilized in preparing the same.

The (a)-hydroxy groupings in the compounds thus obtained, have the same stereochemical configuration as that present in many of the naturally occurring adrenal hormones. This is of special interest in the preparation of pregnene-4-diol-17(a),21-trione-3,11,20 (commonly known as Kendall's compound E), and its 21-acyl derivatives. These compounds are important as adrenal hormones or in therapy requiring adrenal hormone type compounds. They are further useful in the synthesis of similar hormones and compounds.

This application is a continuation-in-part of my co-pending application Serial No. 773,525, filed September 11, 1947.

According to the present invention, 20-keto-pregnane compounds are treated with hydrogen cyanide or one of its salts to produce the corresponding 20-hydroxy-20-cyano-pregnane compound. This product is reacted with a dehydrating agent to produce the corresponding $\Delta^{17}$-20-cyano-pregnene, which is then reacted with an oxidizing agent and the intermediate product hydrolyzed to produce the corresponding 17(a)-hydroxy-20-keto-pregnane compound. The 17-hydroxy group, introduced according to this novel method, is obtained, surprisingly enough, in only one isomeric form, namely the a or "natural" configuration.

These reactions may be chemically represented in the case of 20-keto-pregnane as follows:

For purposes of this application the configuration represented by the notation 17(a)-hydroxy is to be understood to represent the configuration present in the naturally occurring adrenal compounds.

The preferred class of starting materials utilized in practicing the present invention are 20-keto-pregnanes which contain free or esterified hydroxyl groupings in the molecule, and which may also contain keto groupings. These preferred starting materials may be represented by the following generic formula:

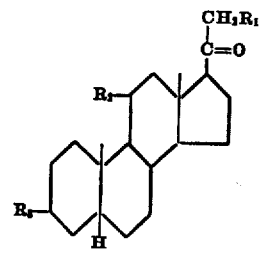

wherein $R_1$ and $R_3$ are radicals selected from the class which consists of hydroxy radicals, acyloxy radicals and hydrogen and $R_2$ is a radical selected from the class which consists of keto radicals and hydrogen.

Examples of this preferred class of starting materials are: 3(a)-hydroxy-11,20-diketo-pregnane, 3 - acetoxy - 11,20 - diketo - pregnane, 3 - benzoxy - 11,20 - diketo - pregnane, 3(a) - hydroxy - 11,20 - diketo - 21 - hydroxy - pregnane, 3(a) - hydroxy - 11,20 - diketo - 21 - acetoxy - pregnane, 3(a),21 - diacetoxy - 11,20 - diketo - pregnane, and the like.

In carrying out my improved process, I ordinarily react a starting material of the above class

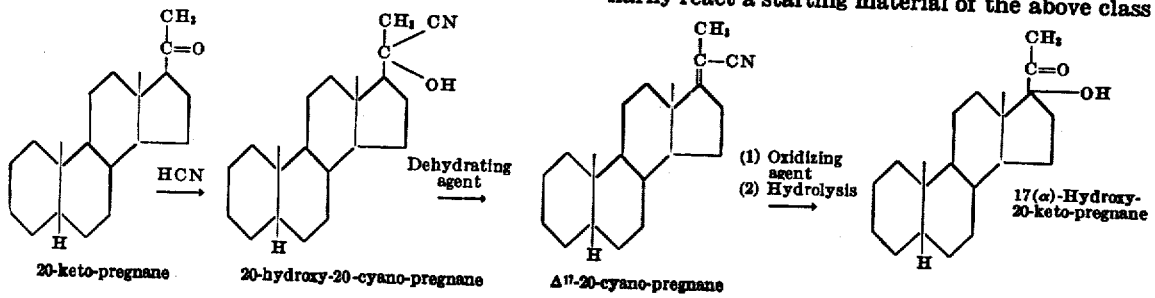

with hydrogen cyanide, or one of its salts, preferably in solution in a lower aliphatic alcohol. When the resulting C-20 cyanhydrin contains free primary or secondary hydroxyl groupings, these may be protected, prior to the dehydration reaction, by conversion to the corresponding acyloxy radicals. This is accomplished by reacting said cyanhydrin with an acylating agent, such as a lower aliphatic acid anhydride. Alternatively, a secondary hydroxyl group may be protected by oxidation to a ketone, since the C-20 cyanhydrin grouping is stable to this treatment. It is ordinarily preferred to conduct this oxidation reaction utilizing chromic acid as the oxidizing agent.

The dehydration reaction is best carried out by treating the cyanhydrin, after acylation or oxidation of any free hydroxyl groupings which may be present, with a dehydrating agent, such as phosphorus oxychloride. This reaction is ordinarily carried out in solution in a substantially anhydrous organic solvent, such as pyridine.

The hydroxylation of the resulting $\Delta^{17}$-20-cyano-pregnene compound is ordinarily carried out by treatment with osmium tetroxide, although other oxidizing agents, such as aqueous potassium permanganate, hydrogen peroxide in conjunction with a catalytic amount of osmium tetroxide, and the like, may be employed, if desired. When osmium tetroxide is employed, the intermediate osmate ester is conveniently hydrolyzed by treatment with an aqueous solution of sodium sulfite. Under these conditions, the intermediate 17,20 - dihydroxy - 20 - cyano pregnane compound is not stable and proceeds, with loss of hydrogen cyanide, to the corresponding 17(a)-hydroxy-20-keto-pregnane derivative.

A preferred feature of my invention is that 17(a)-hydroxy-3,20-diketo-pregnane compounds (after acylation or oxidation of any auxiliary hydroxyl groupings) can be brominated, and the resulting 4-bromo derivative refluxed with pyridine to produce the corresponding $\Delta^4$-17(a)-hydroxy-3,20-diketo pregnene. It is surprising that the 17-hydroxy-20-keto side chain, which is known to be very sensitive to rearrangement in the presence of acids or bases, is stable to the two reactions just described.

Moreover, the 17-hydroxy-20-keto-side-chain is also stable to oxidizing agents. This unexpected property makes it possible to react 3-hydroxy-17(a)-hydroxy - 20 - keto-pregnane compounds with oxidizing agents, such as chromic acid, to produce directly the corresponding 3-keto- 17(a)-hydroxy-20-keto-pregnane compound.

The following examples illustrate methods of carrying out the present invention, but it is to be understood that these examples are given by way of illustration and not of limitation.

*Example 1*

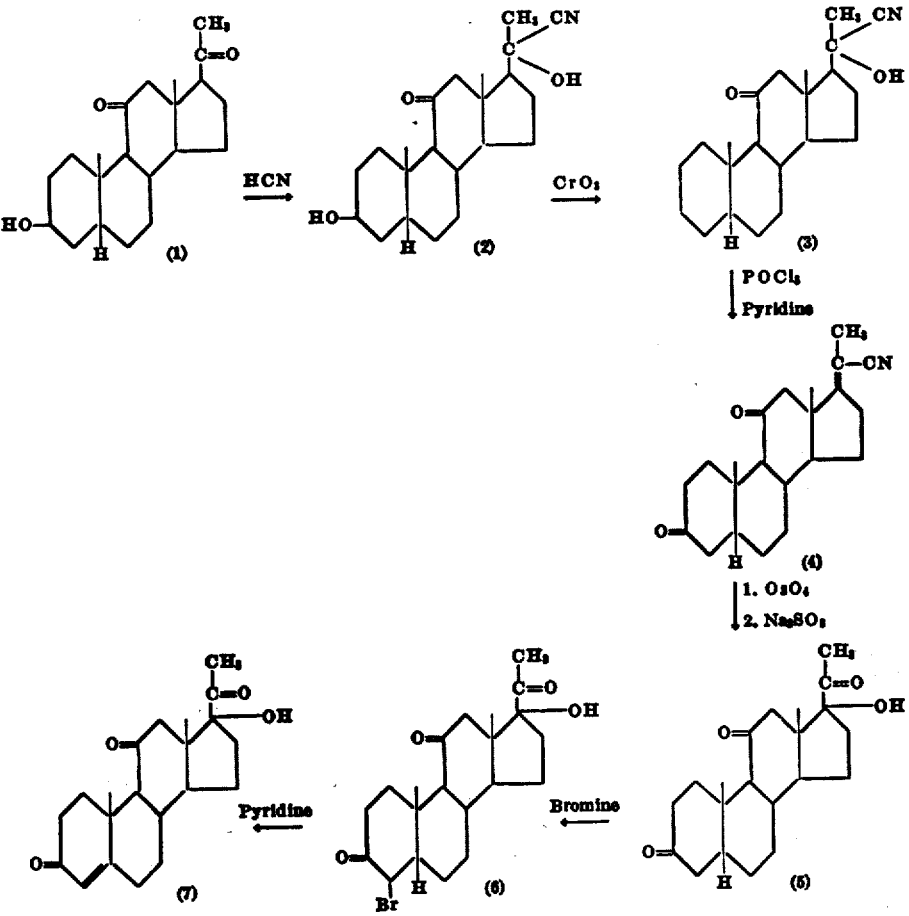

A solution of 1.80 g. of 3(a)-hydroxy-11,20-diketo-pregnane, (compound 1, above), which can be prepared as described by von Euw, Lardon and Reichstein in Helv. Chim. Acta 27, 821 (1944), in a mixture of 25 cc. of alcohol and 6.4 cc. of acetic acid at 0° C. is treated with 6.0 g. of potassium cyanide. The solution is allowed to warm to room temperature and after three hours is diluted with water and filtered. The wet crude cyanhydrin is dissolved in ethyl acetate and the extract washed with water. Crystallization then gives approximately 1.5 g. of 3(a)20-dihydroxy-20-cyano-11-keto-pregnane (compound 2).

To a solution of 1.4 g. of 3(a),20-dihydroxy-20-cyano-11-keto-pregnane in 70 cc. of acetic acid is added at 16° C. a solution of 0.9 g. of chromic acid in 7 cc. of acetic acid. At the end of one hour, water is added, the crystalline precipitate filtered and recrystallized from ethyl acetate to produce approximately 0.93 g. of 3,11-diketo-20-hydroxy-20-cyano-pregnane (compound 3), dec. 170–180° C.

About 0.60 cc. of phosphorus oxychloride is added to a solution containing 2.0 g. of 3,11-diketo-20-hydroxy-20-cyano pregnane dissolved in 6.7 cc. of pyridine. After standing at room temperature for 24 hours, the solution is poured into water and dilute hydrochloric acid, extracted with benzene and concentrated to dryness. The crystalline residue consists of nitriles which may be separated chromatographically to produce approximately 300 mg. of $\Delta^{17}$-3,11-diketo-20-cyano-pregnene (compound 4); M. P. 222–230° C.

200 mgs. of osmium tetroxide and 96 mg. of pyridine are added to a solution containing about 196 mg. of $\Delta^{17}$-3,11-diketo-20-cyano-pregnene (M. P. 222–230° C.) dissolved in 2 cc. of benzene. This solution is allowed to stand at room temperature for approximately 19 hours and then diluted with about 10 cc. of alcohol. A solution of 500 mg. of sodium sulfite in 10 cc. of water is added and the resulting mixture is stirred for approximately 15 hours. Most of the alcohol is then evaporated under reduced pressure and the residue is extracted with benzene. The benzene extract is then washed with water and evaporated to dryness. Addition of ether gives crystalline 3,11,20-triketo-17(a)-hydroxy-pregnane (compound 5); M. P. 198–199° C. This compound may be further purified by recrystallization from dilute acetone to produce substantially pure material; M. P. 205–206° C.

About 41 mg. of bromine is added to a solution of 86 mg. of 3,11,20-triketo-17(a)-hydroxy-pregnane in 1.0 cc. of acetic acid. When the reaction is substantially complete, the solution is immediately poured into water, and the resulting suspension extracted with chloroform. The chloroform extract is washed with water, evaporated to dryness and the residual material crystallized from acetone-ether to produce 4-bromo-3,11,20-triketo-17(a)-hydroxy-pregnane (compound 6).

A solution containing about 71 mg. of 4-bromo-3,11,20-triketo-17(a)-hydroxy-pregnane dissolved in 5 cc. of pyridine is heated under reflux for approximately 5 hours. The pyridine is then evaporated under reduced pressure, the residue is dissolved in ether and the ether extract is washed with dilute aqueous hydrochloric acid, then with water and is finally concentrated to small volume. The product, which separates, is recrystallized several times from methanol to produce substantially pure $\Delta^4$-3,11,20-triketo-17(a)-hydroxy-pregnene (compound 7); M. P. 230–233° C.

*Example 2*

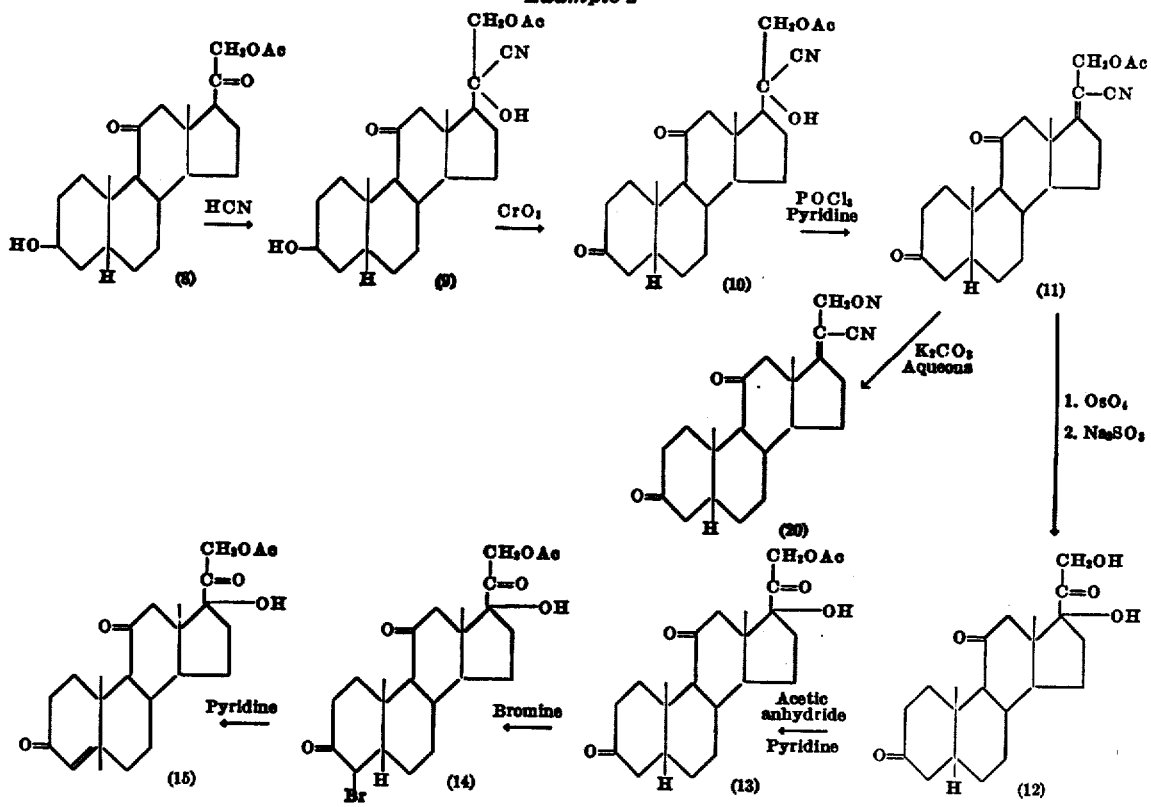

A solution of 2.0 g. of 3(a)-hydroxy-21-acetoxy-11,20-diketo-pregnane (compound 8), which can be prepared as described by von Euw, Lardon and Reichstein, Helv. Chim. Acta 27, 1287 (1944), is treated in a mixture of 25 cc. of alcohol and 6.4 cc. of acetic acid at 0° C. with 6.0 g. of potassium cyanide. The solution is allowed to warm to room temperature and after 3 hours is diluted with water. The addition of a large volume of water to the alcohol-hydrogen cyanide mixture precipitates a gum which is extracted with chloroform or ethyl acetate. The extract is washed with water, and evaporated to small volume under reduced pressure. The crystalline precipitate (1.3 g.) consists of 3(α),20-dihydroxy-20-cyano-21-acetoxy-11-keto-pregnane (compound 9); dec. 175-185° C.

A solution of 0.60 g. of chromic acid in 1.2 cc. of water and 11 cc. of acetic acid is added to a solution containing about 1.2 g. of 3(α),20-dihydroxy-20-cyano-21-acetoxy-11-keto-pregnane at room temperature. After 1 hour, water is added and the product which precipitates, is filtered and recrystallized from ethyl acetate to produce 3,11-diketo-20-hydroxy-20-cyano-21-acetoxy-pregnane (compound 10); dec. 214-217° C.

0.40 cc. of phosphorus oxychloride is added to a solution containing about 950 mg. of 3,11-diketo-20-hydroxy-20-cyano-21-acetoxy-pregnane dissolved in 3 cc. of pyridine. After standing at room temperature for 24 hours, the solution is poured into water and dilute hydrochloric acid, extracted with benzene and concentrated to dryness. The crude product, after chromatography gives one main constituent, namely $\Delta^{17}$-3,11-diketo-20-cyano-21-acetoxy-pregnene (compound 11); M. P. 189-190° C.

This compound is further identified by hydrolysis to the corresponding 21-hydroxy derivative, without affecting the cyano grouping. About 150 mg. of the $\Delta^{17}$-3,11-diketo-20-cyano-21-acetoxy-pregnene (compound 11) is dissolved in 5 cc. of methanol, and a solution containing 200 mg. of potassium carbonate in 2 cc. of water added thereto. The resulting solution is maintained at approximately 50° C. for fifteen minutes, the methanol is evaporated in vacuo, and the crystalline product, which precipitates, recovered by filtration. Recrystallization of this material from ethyl acetate gives substantially pure $\Delta^{17}$-3,11-diketo-20-cyano-21-hydroxy-pregnene (compound 20); M. P. 263-265° C.

aqueous suspension is then extracted four times with chloroform, the chloroform extracts are combined, washed with water and concentrated to dryness in vacuo. Recrystallization of the residue from acetone gives 3,11,20-triketo-17(α)-21-dihydroxy-pregnane (compound 12); M. P. 227-229° C.

This compound is then treated with acetic anhydride and pyridine for 15 minutes at room temperature to produce 3,11,20-triketo-17(α)-hydroxy-21-acetoxy-pregnane (compound 13); M. P. 222-224° C.

A solution containing 132 mg. of bromine in 1.0 cc. of acetic acid is added to a solution containing 333 mg. of 3,11,20-triketo-17(α)-hydroxy-21-acetoxy-pregnane dissolved in 5.0 cc. of acetic acid. When the reaction is substantially complete, the solution is immediately poured into water, and the resulting suspension extracted with chloroform. The chloroform extract is washed with water, evaporated to dryness, and the residual material crystallized from acetone-ether to produce 4-bromo-3,11,20-triketo-17(α)-hydroxy-21-acetoxy-pregnane (compound 14); dec. 190° C.

A solution of 300 mg. of 4-bromo-3,11,20-triketo-17(α)-hydroxy-21-acetoxy-pregnane in 12 cc. of pyridine is heated for 5 hours under reflux. The pyridine is evaporated in vacuo, the residue is dissolved in chloroform, and the chloroform extract is washed with dilute aqueous hydrochloric acid and with water. The chloroform is evaporated under reduced pressure, and the residual material recrystallized several times from alcohol to produce substantially pure $\Delta^4$-3,11,20-triketo-17(α)-hydroxy-21-acetoxy-pregnene (compound 15); M. P. 236-238° C. (This compound is otherwise designated as Kendall's compound E acetate.)

*Example 3*

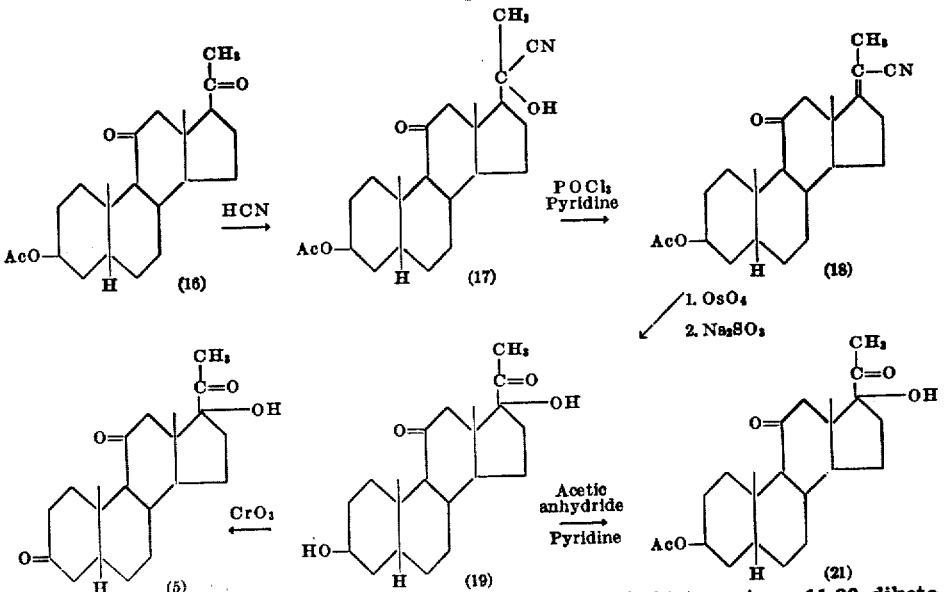

A solution of 1.0 g. of $\Delta^{17}$-3,11-diketo-20-cyano-21-acetoxy-pregnene in 10 cc. of benzene is treated with 1.0 g. of osmium tetroxide and 0.43 g. of pyridine. After standing at room temperature for 18 hours, the resulting solution is treated successively with 50 cc. of alcohol, and with 50 cc. of water containing 2.5 g. of sodium sulfite. The mixture is stirred for 30 hours, filtered, and the filtrate acidified with 0.5 cc. of acetic acid and concentrated to small volume in vacuo. The About 1.70 g. of 3(α)-acetoxy-11,20-diketo-pregnene (compound 16) which can be prepared as shown by von Euw, Lardon and Reichstein in Helv. Chim. Acta 27, 821 (1944) is dissolved in a mixture of 25 cc. of alcohol and 6.4 cc. of acetic acid and the solution is treated at 0° C. with 6.0 g. of potassium cyanide. The solution is allowed to warm to room temperature and after three hours is diluted with water and the material which precipitates recovered by filtration. The 3(α)-acetoxy - 20 - hydroxy-20-cyano-11-keto-pregnane (compound 17), thus obtained, may be purified by recrystallization from ethyl acetate. It decomposes at about 221–223° C. Yield approximately 90% of theory.

To a solution of 293 mg. of 3(α)-acetoxy-20-hydroxy-20-cyano-11-ketopregnane in 1.0 cc. of dry pyridine is added 0.10 cc. of phosphorus oxychloride. After standing at room temperature for 24 hours, the solution is poured into water and dilute hydrochloric acid, extracted with benzene and the benzene extract concentrated to dryness. The crystalline residue consists of a mixture of unsaturated nitriles which may be separated chromatographically to produce Δ17-3(α)-acetoxy-11-keto-20-cyano-pregnene, (compound 18); M. P. 194–195° C.

About 1.70 g. of osmium tetroxide and 0.75 cc. of pyridine are added to a solution containing about 1.65 g. of Δ17-3(α)-acetoxy-11-keto-20-cyano-pregnene dissolved in 16 cc. of benzene. This solution is allowed to stand at room temperature for approximately 20 hours and then treated with a solution of 3.0 g. of sodium sulfite in 50 cc. of water. The benzene is then evaporated in vacuo until the volume of distilland is about 5 cc., and said distilland is diluted with about 50 cc. of alcohol. The resulting mixture is stirred at room temperature for about 20 hours, filtered, acidified with a few drops of acetic acid and evaporated to small volume under reduced pressure. The aqueous mixture is extracted with chloroform, the chloroform solution evaporated to dryness in vacuo, and the residual material crystallized from acetone-ether to produce approximately 800 mg. of crude product. This material is purified by recrystallization from dilute alcohol to produce substantially pure 3(α),17(α) - dihydroxy-11,20-diketo-pregnane (compound 19); M. P. 207–208° C.; [α]$_D^{25}$=+86.5°; Anal. calc'd for $C_{21}H_{32}O_4$: C, 72.39; H, 9.25; found: C, 72.54; H, 9.19.

The product (850 mg.) obtained upon evaporation of the mother liquors from the above preparation consists of a crystalline mixture of 3(α),17(α)-dihydroxy - 11,20 - diketo-pregnane and its 3-acetate. This crystalline mixture is dissolved in a solution containing 3 cc. of pyridine and 3 cc. of acetic anhydride. The resulting mixture is allowed to stand for approximately 3 hours and is then diluted with water to produce approximately 850 mg. of crystalline product; M. P. 206–208° C. Recrystallization of this material from dilute alcohol gives substantially pure 3(α)-acetoxy-17(α)-hydroxy-11,20-diketo-pregnane (compound 21); M. P. 208–209° C.; α$_D^{25}$=+56°; Anal. calc'd for $C_{23}H_{34}O_5$: C, 70.73; H, 8.79. Found: C, 70.83; H, 8.96.

The 3(α),17(α) - dihydroxy - 11,20 - diketo-pregnane (compound 19) is converted to the corresponding 3-keto-derivative as follows: A solution of 75 mg. of said 3(α),17(α)-dihydroxy-11,20-diketo-pregnane is dissolved in 0.8 cc. of acetic acid containing 0.2 cc. of water, and the solution is treated with a solution containing 60 mg. of chromic acid in 0.06 cc. of water and 1.14 cc. of acetic acid. After standing at room temperature for 10 minutes, the reaction solution is diluted with water and extracted twice with chloroform. The chloroform solution is washed with water and evaporated to dryness under reduced pressure. The residual product is crystallized from ether and recrystallized from dilute acetone to produce substantially pure 3,11,20-triketo-17(α)-hydroxy-pregnane (compound 5); M. P. 205–206° C.

*Example 4*

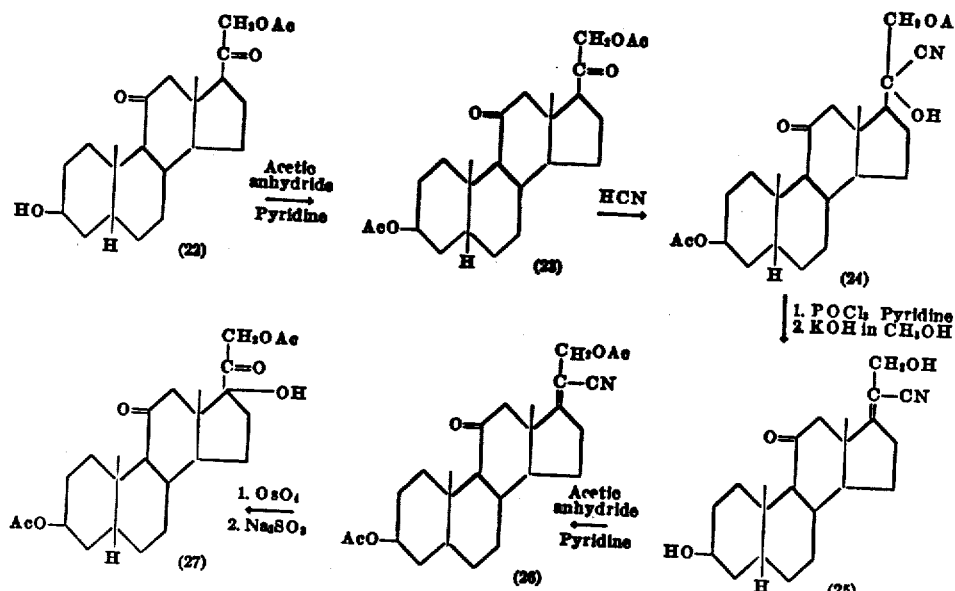

3(α) - hydroxy - 11,20-diketo-21-acetoxy-pregnane (22) is treated with excess pyridine-acetic anhydride and the mixture warmed on the steam bath for approximately 10 minutes. The resulting solution is diluted with water and extracted with ether. The ethereal extract is washed with dilute hydrochloric acid, dilute sodium carbonate, and finally with water. The ether extract is then evaporated to small volume, and petroleum ether is added thereto to produce crystals of 3(α),21-diacetoxy-11,20-diketo-pregnane; (compound 23) M. P. 100–110° C., which contain 10% of solvent of crystallization. Recrystallization of this material from benzene-petroleum ether gives a product having a dec. point of 82–90° C.

About 3.0 g. of said 3(α),21-diacetoxy-11,20- diketo-pregnane is dissolved in a mixture of 30 cc. of alcohol and 11.4 cc. of acetic acid, and the resulting solution is cooled to 0° C. and treated with about 10.6 g. of potassium cyanide. The mixture is stirred for about one-half hour, and then permitted to warm to room temperature. After two hours, the solution is diluted with water, and the crystalline precipitate thus obtained is filtered and washed. The wet cake is dissolved in ethyl acetate, excess water removed, and the solution is evaporated to small volume in vacuo. Petroleum ether is added to the resulting solution thereby precipitating crystalline 3($a$),21-diacetoxy-11-keto-20-hydroxy-20-cyano-pregnane; (compound 24) M. P. 148–160° C. with dec.

To a solution of about 2.2 g. of 3($a$),21-diacetoxy-11-keto-20-hydroxy-20-cyano-pregnane in about 8 cc. of dry pyridine is added approximately 1.2 cc. of phosphorus oxychloride. After standing at room temperature for 24 hours, the reaction solution is poured into water and dilute hydrochloric acid. The resulting aqueous mixture is extracted with benzene and the benzene extract is evaporated to produce approximately 2.0 g. of an oil. This oil is subjected to chromatographic separation and the portions which are eluted, employing petroleum ether-ether mixtures, are combined to produce approximately 1.84 g. of crude $\Delta^{17}$-3($a$),21-diacetoxy-11-keto-20-cyano-pregnene which is obtained as an oil.

This oil is saponified by dissolving in a mixture of 10 cc. of benzene and 10 cc. of 1.1 N methanolic potassium hydroxide. After 10 minutes the solution is acidified with acetic acid, the benzene is evaporated in vacuo, and the residual material crystallized from dilute methanol to produce 1.45 g. of crude product; M. P. 242–254° C. This material is further purified by recrystallization from acetone and from dilute alcohol to produce substantially pure $\Delta^{17}$-3($a$),21-dihydroxy-11-keto-20-cyano-pregnene; (compound 25) M. P. 256–257° C.

This product is treated with excess acetic anhydride and pyridine, at room temperature, to produce substantially pure $\Delta^{17}$-3($a$),21-diacetoxy-11-keto-20-cyano-pregnene (compound 26).

To a solution of 1.1 g. of said $\Delta^{17}$-3($a$),-21-diacetoxy-11-keto-20-cyano-pregnene in 11 cc. of dry benzene is added 1.1 g. of osmium tetroxide and 0.50 cc. of pyridine. After standing at room temperature overnight, the mixture is treated with 50 cc. of water containing 2.0 g. of sodium sulfite. The resulting mixture is then evaporated in vacuo to a volume of about 5 cc., and the residual product is diluted with approximately 50 cc. of alcohol. The mixture is stirred at room temperature for 20 hours, filtered, acidified with a few drops acetic acid and evaporated to small volume in vacuo. The aqueous mixture is extracted with chloroform and the chloroform solution is evaporated to dryness in vacuo to produce an amorphous product which presumably consists of a mixture of equal amounts of 3($a$),17($a$),21-trihydroxy-11,20-diketo-pregnane and its 3-monoacetate. In addition, the product is contaminated with some green osmium salts. These osmium salts are partially removed by dissolving the product in a small volume of acetone and diluting with 100 cc. of absolute ether. The flocculent precipitate is separated and the supernatant yellowish solution is evaporated to dryness. The residual material is dissolved in a mixture of 5 cc. of pyridine and 5 cc. of acetic anhydride, and the resulting solution is allowed to stand at room temperature for several hours. The reaction solution is diluted with water and the crystalline material, which precipitates, is recovered by filtration. This product is then recrystallized from dilute acetone and from alcohol to produce 504 mg. of substantially pure 3($a$),21-diacetoxy-17($a$)-hydroxy-11,20-diketo-pregnane (compound 27); M. P. 233–236° C.; $[\alpha]_D^{25} = +93°$. (Additional recrystallization from benzene and from acetone-ether failed to raise the melting point or to remove a trace of greenish discoloration from this product.)

Modifications may be made in carrying out the present invention without departing from the spirit and scope thereof, and the invention is to be limited only by the appended claims.

I claim:

1. The process which comprises treating a $\Delta^{17}$-20-cyano-pregnene compound with osmium tetroxide, and hydrolyzing the osmate ester, thus obtained, with aqueous sodium sulfite to produce the corresponding 17($a$)-hydroxy-20-keto-pregnane compound.

2. The process which comprises reacting osmium tetroxide with a compound of the formula:

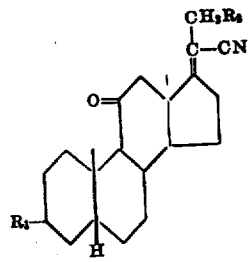

wherein $R_1$ is a radical selected from the class which consists of keto and acyloxy radicals, and $R_2$ is a radical selected from the class which consists of hydrogen and acyloxy radicals, and reacting the osmate ester thus obtained with aqueous sodium sulfite thereby hydrolyzing said osmate ester to produce a compound of the formula:

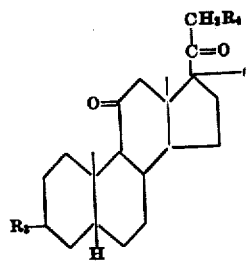

wherein $R_3$ is a radical selected from the class which consists of keto and hydroxy radicals, and $R_4$ is a radical selected from the class which consists of hydrogen and hydroxy radicals.

3. The process which comprises treating $\Delta^{17}$-3,11-diketo-20-cyano-21-acetoxy-pregnene with osmium tetroxide, and hydrolyzing the osmate ester, thus obtained, to produce 17($a$), 21-dihydroxy-3,11,20-triketo-pregnane.

4. The process which comprises reacting $\Delta^{17}$-3($a$)-acetoxy-11-keto-20-cyano-pregnene with osmium tetroxide and hydrolyzing the osmate ester, thus obtained, with aqueous sodium sulfite to produce 3($a$),17($a$)-dihydroxy-11,20-diketo-pregnane.

5. The process which comprises reacting $\Delta^{17}$-3($a$),21-diacetoxy-11-keto-20-cyano - pregnene with osmium tetroxide and hydrolyzing the osmate ester, thus obtained, with aqueous sodium sulfite to produce 3(a),17(a),21-trihydroxy-11,20-diketo-pregnane.

6. 3,11,20 - triketo - 17(a) - 21 - dihydroxy-pregnane.

7. 3(a),17(a) - dihydroxy - 11,20 - diketo-pregnane.

LEWIS HASTINGS SARETT.

REFERENCES CITED

The following references are of record in the file of this patent:

UNITED STATES PATENTS

| Number | Name | Date |
|---|---|---|
| 2,403,683 | Reichstein | July 9, 1946 |

OTHER REFERENCES

Euw et al., Helv. Chim. Acta. 25, pages 988–1022 (1942).

Kendall, Jour. Biol. Chem. 114, page LVII (1936).

Mason and Kendall, Jour. Biol. Chem., 114, pages 626–627 (1936).